United States Patent [19]
Brudi et al.

[11] 3,865,265
[45] Feb. 11, 1975

[54] LIFT TRUCK SAFETY ACCESSORY

[75] Inventors: Ronald A. Brudi; Randall W. Matthewson, both of Longview, Wash.; Randall P. Wheeler, Rainier, Oreg.

[73] Assignee: Brudi Equipment, Inc., Longview, Wash.

[22] Filed: Aug. 20, 1973

[21] Appl. No.: 389,696

[52] U.S. Cl................. 214/674, 33/348, 33/366, 212/39 A, 214/761
[51] Int. Cl................................................ B66f 9/20
[58] Field of Search ........... 214/660, 761, 670, 671, 214/672, 673, 674, 701 P, 701 Q; 212/39 A; 33/348, 366

[56] References Cited
UNITED STATES PATENTS

| 427,022 | 4/1890 | Weston | 324/154 R |
|---|---|---|---|
| 1,477,545 | 12/1923 | Day | 33/396 |
| 1,750,962 | 3/1930 | Lichtenberg | 212/39 A |
| 1,952,745 | 3/1934 | Deasy | 33/392 |
| 2,374,298 | 4/1945 | Nasset | 212/39 A |
| 2,772,411 | 11/1956 | Cooper | 340/267 C |
| 2,924,022 | 2/1960 | Callahan | 33/396 |
| 3,079,697 | 3/1963 | Lunde | 33/366 |
| 3,324,564 | 6/1967 | Wright et al. | 33/366 |

FOREIGN PATENTS OR APPLICATIONS

| 179,244 | 5/1962 | Sweden | 214/673 |

*Primary Examiner*—Robert J. Spar
*Assistant Examiner*—Lawrence J. Oresky
*Attorney, Agent, or Firm*—Chernoff & Vilhauer

[57] ABSTRACT

A safety accessory adapted for mounting on a lift truck for indicating to the operator the direction and precise degree of tilt of the mast either forwardly or rearwardly from a vertical position, and also for similarly indicating the side tilt of the truck if desired. The accessory comprises a housing containing a tilt indicator having a gravity sensing element and electrical means for generating a variable signal corresponding to the direction and degree of tilt of the housing within a suitable range on either side of a predetermined null position. The housing is adapted to be rigidly mounted on the lift truck mast so that the indicated tilt of the housing corresponds with that of the mast. Adjustment means are provided for permitting the predetermined null position of the housing to be varied with respect to the mast to achieve correspondence between the null position of the housing and the vertical position of the mast. For measuring side tilting of the truck, the housing is mounted generally at right angles to the position required for measuring mast tilt, either on the mast or on the lift truck body. A tilt display device adapted for receiving the signals generated by the tilt indicator and showing both the direction and degree of tilt is provided for mounting in the lift truck operator's compartment. A flexible conduit couples the housing with the tilt display device and includes both signal transmission lines for transmitting the signals generated by the tilt indicator and also electrical power lines for conducting electrical current to the indicator to generate the signals. Several embodiments of the invention are disclosed, one utilizing an electrolytic transducer and associated bridge circuit as the tilt indicator, another featuring a pendulum potentiometer and a third utilizing fiber optic rods to transmit the tilt indicating signals.

18 Claims, 8 Drawing Figures

PATENTED FEB 11 1975　3,865,265

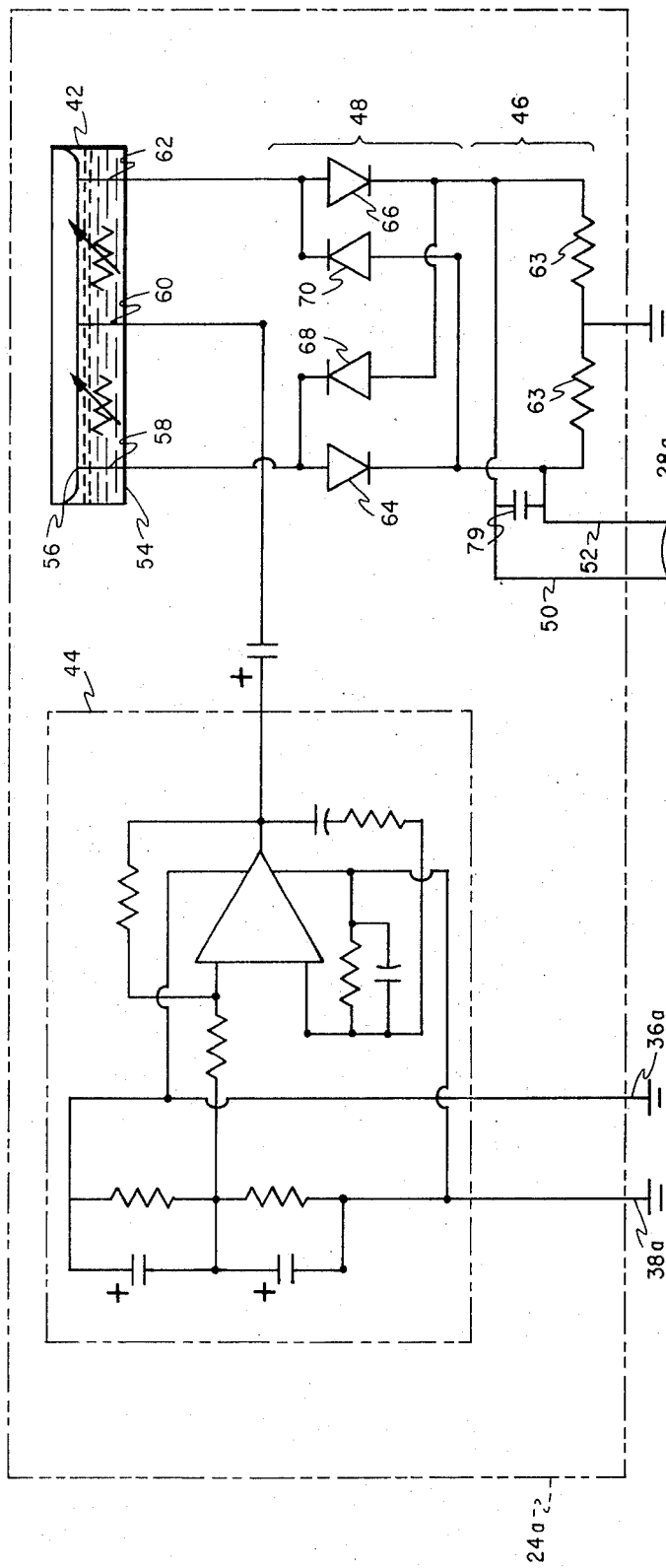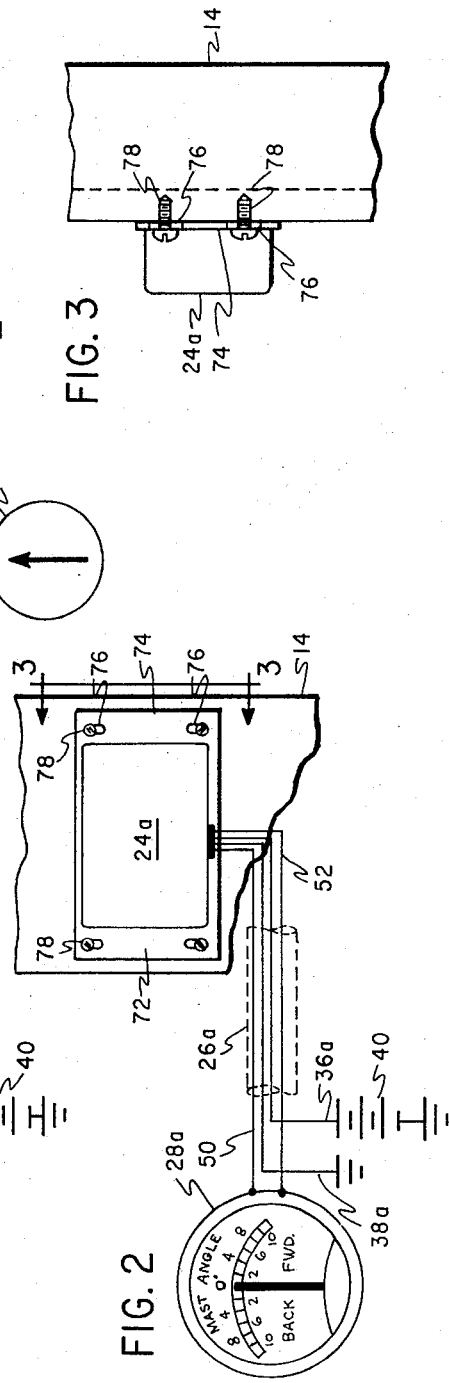

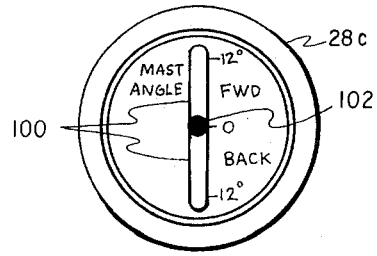
FIG. 7
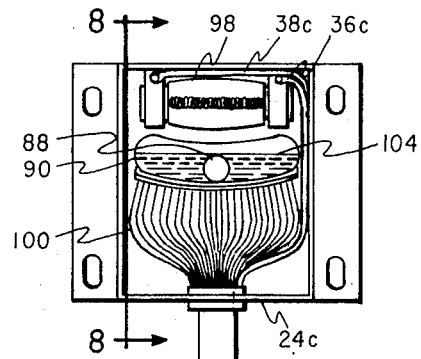
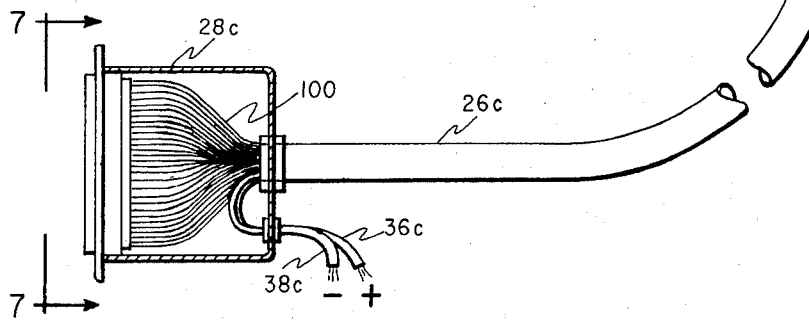
FIG. 6
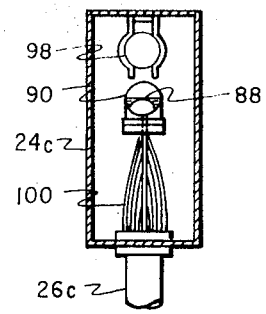
FIG. 8

LIFT TRUCK SAFETY ACCESSORY

BACKGROUND OF THE INVENTION

This invention relates to improvements in apparatus for indicating the direction and degree of forward and backward tilt of a lift truck mast, or alternatively the direction and degree of side tilt of the truck. More specifically the apparatus is of the gravity sensing type for measuring absolute tilt relative to true vertical and includes means remote from the gravity sensing indicator for conveniently providing visual indicia in the operator's compartment of the precise degree and direction of tilt.

The safe operation of a materials handling lift truck, affecting both its operator and any workmen who may be in the immediate vicinity, depends to a large extent on the stability of the truck, i.e., its resistance to tipping to the front or side under the widely varying load conditions to which it is subjected. The problem of maintaining stability is compounded severely by the fact that the great majority of lift trucks in operation today are of the type which employ a tiltable telescopic mast having a load carriage mounted thereon for movement up and down. Such masts are tiltable both forwardly and rearwardly, normally through an arc of from 5° to 15° to the front and from 10° to 15° to the rear of a vertical position. Front tilt is necessary to permit the load engaging forks of the truck to pick up and deposit a load, while rear tilt prevents the load from inadvertently sliding forwardly off the forks while the truck is transmitting the load from one location to another.

The front or rear tilt attitude of the mast is extremely critical to the stability of the truck, especially when the load is in a raised position. For example, depending upon the weight of a particular load and the height to which it is raised, the rearward tilt of the mast merely of a few degrees (much less than the maximum possible tilt) might move the combined center of gravity of the truck and load far enough rearwardly that the truck will be highly susceptible to side tipping. This is due in part to the fact that the rear axle of a lift truck is pivotally mounted to the lift truck frame at the axle midpoint, thereby establishing a generally triangular wheel base decreasing in width toward the rear of the truck. Conversely a slight forward tilt of a few degrees, depending upon the same variables, may be sufficient when the load is in a raised position to tip the truck forwardly since it may move the combined center of gravity of the truck and load ahead of the position of the front axle.

Truck stability is also greatly affected by any side tilting attitude of the truck, which may be caused for example by turning the truck on a sloped floor surface or encountering floor elevations or depressions affecting one side of the truck only. Such side tilting tips the mast sideways and, depending again upon the weight of the load and the height to which it is raised, may thereby cause the truck to overturn to one side.

Because of the high frequency of disabling injuries to workmen caused by lift truck tipping accidents, various types of devices and systems have been proposed in the past to help alleviate the dangers associated with the variable tilt of extensible lift truck masts. The systems range from relatively crude devices such as those shown in Bertenshaw et al., U.S. Pat. No. 3,049,257, Foster U.S. Pat. No. 3,312,361 and Arnot et al., U.S. Pat. No. 2,767,394 to sophisticated load sensing systems which automatically prevent the operator from tilting the mast in excess of predetermined limits, or from raising the load when the mast is so tilted. The problems with tilt indicating devices such as those shown in the aforementioned patents are that such devices are not conveniently within the view of the lift truck operator and thus are not effectively used. Because the operator is constantly busy manipulating both the truck and the load in a high production operation, he can afford to spend very little time or effort consulting a tilt indicator prior to raising a load. Accordingly he will usually neglect to do so if the indicator is not easy to read. In addition, some of the prior art indicators are overly susceptible to the effects of lift truck vibrations and accordingly do not provide stable or accurate readings, while others do not indicate the absolute tilt of the mast with respect to the ground but only the tilt relative to the main body of the lift truck, thereby supplying the operator with inadequate information. The automatic tilt limiting systems on the other hand have proven to be so expensive that they are rarely installed on lift trucks. Certain other types of devices have been designed for measuring boom angles of cranes, but these devices are both expensive and totally unsuited for use with lift trucks inasmuch as they are not designed to indicate both direction and degree of tilt to either side of a central null position. Accordingly there exists a great need for a lift truck tilt indicating accessory which is sufficiently accurate and convenient to use from the standpoint of the lift truck operator, and yet which is simple and inexpensive to achieve widespread use, that it will contribute effectively toward reducing the present high number of lift truck tipping accidents.

SUMMARY OF THE PRESENT INVENTION

The present invention is directed to a tilt indicating safety accessory of the general type described in which a housing is provided having a gravity sensing tilt indicator mounted therein for precisely sensing the degree of tilt of the housing in a predetermined tilting plane, such tilt indicator having electrically powered means for generating a variable electrical or optical signal corresponding to the degree and direction of tilt of the housing within a range in either direction from a predetermined null position. The housing is adapted to be mounted rigidly to a lift truck mast in such a position that the tilting plane of the housing is perpendicular to the tilting axis of the mast. Adjustment means are provided for permitting the predetermined null position of the housing to be adjusted with respect to the mast so as to achieve correspondence with the vertical position of the mast. Alternatively the housing may be mounted to the main body or mast of the lift truck such that the tilting plane is perpendicular to the direction of travel of the truck for indicating degree and direction of side tilt. In the latter case the adjustment means permits the null position to be made coincident with the level attitude of the truck. A tilt display device, adapted for mounting on the main body of the lift truck remote from the housing, is provided for producing convenient visual indicia of the direction and degree of tilt of the housing in response to the signals generated by the tilt indicator. A flexible conduit joining the display device with the tilt indicator housing includes both transmission leads for conducting the signals and leads for conducting electrical current tapped from the lift truck electrical system necessary to generate the signals. The conduit has sufficient excess length to permit it to compensate for the tilting movement of the mast relative to the main body of the lift truck regardless of the movement of the mast forwardly or rearwardly from its vertical position.

In one embodiment of the invention the tilt indicator comprises an electrolytic transducer and an associated bridge circuit connected to a DC meter calibrated in degrees of tilt. In this embodiment the accessory includes an integral oscillator circuit for converting the DC power tapped from the lift truck to AC power so as to prevent polarization and resultant deterioration of the electrolyte, and a rectifier circuit to permit proper operation of the meter. A second embodiment features a variable pendulum potentiometer as the tilt indicator, coupled by appropriate circuitry with a DC meter. A third embodiment features a mechanical gravity sensing element interposed between a light source and an array of fiber optic rod ends arranged such that the rod ends receive and transmit a variable light signal corresponding to the tilt of the housing. In the latter embodiment the tilt display device comprises the opposite ends of the rods arranged coherently with respect to their arrangement adjacent the gravity sensing element.

In order to insure accuracy and stability of the accessory, damping means are provided in all embodiments for minimizing unwanted oscillations in the tilt signal caused by vibrations due to the motion of the lift truck, floor and ground irregularities and abrupt changes in the tilting movement of the mast. In the case of the electrolytic transducer embodiment, either the electrolytic liquid is made sufficiently viscous to damp out the unwanted vibrations or else a capacitance of sufficient value to filter out the unwanted oscillations is shunted across the meter to substantially limit its response speed. In the case of the pendulum potentiometer and fiber optic systems, the gravity sensing element is preferably immersed in a liquid having sufficient viscosity to damp out the effect of the unwanted vibrations and stabilize the tilt signals.

The safety accessory of the present invention has the primary advantage of providing an accurate and stable indication of the absolute tilting attitude of the mast or side tilting attitude of the truck at any particular time, presenting such tilt information visually to the operator in such an easily readable and convenient display that the operator is encouraged to consult the tilt readings in all cases prior to lifting a load when the attitude of the mast may have a bearing on the stability of the truck. These features, coupled with the relative simplicity and resultant modest cost of the device rendering its installation on all lift trucks economically feasible, enable the achievement of its primary objective of accident prevention. The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 2 is a partially schematic front view of the exterior parts of the embodiment of the accessory incorporating an electrolytic transducer, showing the mounting detail.

FIG. 3 is an end view of the mounting detail taken along line 3—3 of FIG. 2.

FIG. 4 is a circuit diagram showing the electrolytic transducer and its associated bridge, rectifier and oscillator circuits.

FIG. 6 is an extended view of a third embodiment of the accessory featuring fiber optic signal transmission and display means, with portions of the apparatus removed to show inner elements.

FIG. 7 is a front view of the display device of FIG. 6, taken along line 7—7 of FIG. 6.

FIG. 8 is an end view of the fiber optic tilt indicator taken along line 8—8 of FIG. 6.

DETAILED DESCRIPTION OF THE INVENTION

Figure 1:
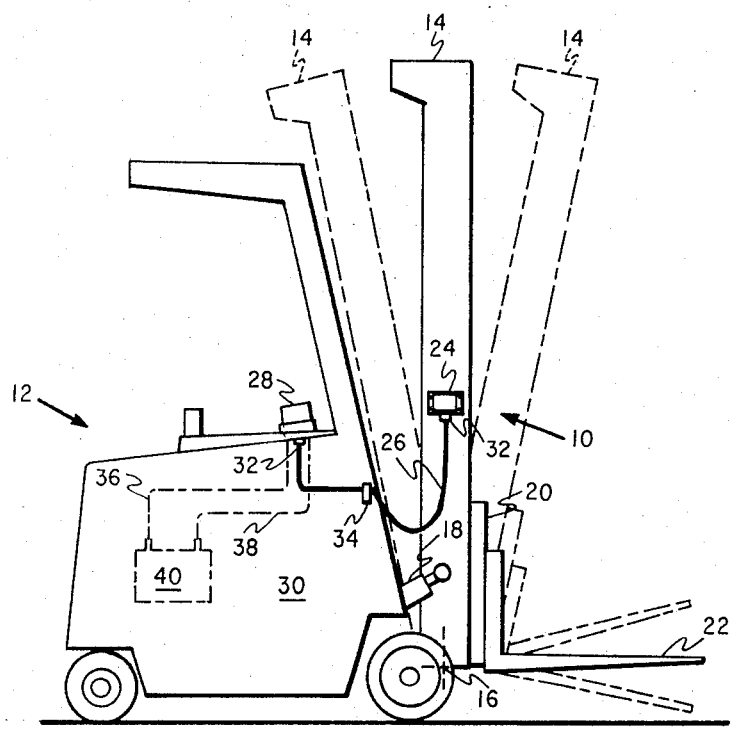
FIG. 1 is a side view, partially schematic, of a conventional tilting-mast lift truck showing the safety accessory of the present invention mounted thereon for measuring forward and rearward tilt of the mast.

The safety accessory of the present invention, indicated generally as 10, is shown in FIG. 1 mounted on a representative lift truck 12. The lift truck 12 includes structural characteristics common to the great majority of materials handling trucks presently in use in that it incorporates an extensible telescopic mast 14 pivotally mounted to the main body 30 of the lift truck by means of bushings (not shown) so as to rotate about a horizontal tilt axis 16 transverse to the direction of travel of the truck. The pivotal tranverse mounting enables the mast 14 to be tilted forwardly or rearwardly (as depicted by the dotted lines in FIG. 1) from a central vertical position in response to the lift truck operator's actuation of a pair of hydraulic tilt cylinders 18. Except in the case of a truck having an exceptionally high lifting capability, the cylinders 18 are usually capable of tilting the mast 14 from 5° to 15° forward and from 10° to 15° rearward of the central vertical position. Mounted for vertical reciprocation on the mast 14 is a load carriage 20 having suitable load engaging means such as forks 22.

The safety accessory 10 comprises a housing 24, adaptable to be mounted on the mast 14 for sensing mast tilt or alternatively on the truck body 30 for sensing side tilt. The housing 24 is coupled by means of a flexible conduit 26 to a tilt display device 28 which is adapted for mounting on the main body 30 of the lift truck in the operator's compartment. The conduit 26 has sufficient excess length that it is capable of bridging the gap between the mast 14 and the main body 30 of the truck regardless of whether the mast is at full forward or full backward tilt. Preferably strain relief bushings 32 are provided at either end of the conduit adjacent the housing 24 and tilt display device 28 respectively to prevent falling objects or other obstructions which may come in contact with the conduit 26 from inadvertantly pulling it from its end connection points. A clip or clamp 34 may optionally be mounted on the main body of the lift truck adjacent the gap between the main body and the mast to provide further support for the conduit. In all of the embodiments of the invention the tilt indicator mounted protectively within housing 24 utilizes electrical power in its operation. Accordingly one of the functions of the conduit 26 is to conduct electrical current from the main body 30 of the lift truck to the housing 24. The accessory 10 is provided with a pair of electrical connectors, indicated schematically as 36 and 38, for coupling with the DC power source 40 of the lift truck.

The embodiment of the accessory 10 illustrated in FIGS. 2–4 includes a housing 24a having mounted therein an electrolytic transducer 42 serving as the gravity sensing tilt indicator, an oscillator circuit designated generally as 44, a bridge circuit 46 for generating a variable signal corresponding to the degree of tilt of the transducer and a rectification circuit 48. The aforementioned components within the housing 24a are coupled by means of conduit 26a through a pair of signal transmission leads 50 and 52 to a DC meter 28a, preferably of the d'Arsonval type, which acts as the tilt display device. Leads 36a and 38a extend through the conduit 26a to supply direct current from the lift truck to the oscillator circuit 44.

The electrolytic transducer 42 is of conventional design consisting of a sealed tubular glass envelope 54 filled with an electrolytic liquid 56 and having metal electrodes 58, 60 and 62 respectively immersed in the liquid 56. When electrical current is fed to the middle input electrode 60, and the transducer 42 is level so that the two output electrodes 58 and 62 respectively are equally immersed in the electrolyte, equal impedances to the common input electrode 60 will exist. Accordingly the two branches of the resistive bridge circuit 46, which includes identical resistors 63, will be balanced and the tilt display voltmeter 28a will indicate no voltage difference across the bridge 46. Tilting the transducer to one side will increase the impedance between one output electrode and the common electrode 60 due to reduced immersion, while the opposite change occurs at the other output electrode. Consequently a voltage difference will exist in the two branches of the bridge circuit and will result in a voltage signal proportional to the tilt angle sensed by the meter 28a.

The electrical current fed to the middle input electrode 60 of the transducer 42 must be alternating current having a positive and negative half-cycle, since the electrolyte will otherwise gradually become polarized and ineffective if direct current is applied. Since the only available supply of electrical power is the direct current source 40 of the lift truck, an oscillator circuit 44 is interposed in the power supply line to convert the lift truck power supply to an alternating current wave form. The oscillator circuit may be of any suitable conventional design; a circuit incorporating a Fairchild A741 operational amplifier has been determined to be acceptable for the purpose.

A d'Arsonval or other DC instrument sensitive to polarity is employed because of the necessity for measuring direction as well as degree of tilt of the transducer 42. However since alternating current is employed in the transducer and the associated bridge circuit 46, it is necessary that a rectification circuit 48 be provided to enable the DC meter 28a to function properly. Thus, when due to the tilt of the transducer 42 the amplitude of the voltage sensed on the right-hand side of the bridge circuit is greater than that sensed on the left-hand side of the bridge circuit, diodes 64 and 66 insure that the greater positive amplitude will be on the right-hand side of the bridge during the positive half-cycle while diodes 68 and 70 and their related connectors insure that the negative amplitudes will cross to opposite sides of the bridge, thereby continuing to maintain the greater positive voltage on the right-hand side of the bridge even during the negative half-cycle. A reverse result occurs if the greater voltage amplitude is on the left rather than the right-hand side of the bridge due to the reverse tilting of the transducer 42. Accordingly the meter 28a, which is spring-biased to a central position corresponding to a null or "zero tilt" reading when the bridge is balanced, will be caused to indicate either to the right or left of the null reading depending upon which side of the bridge has the greatest voltage amplitude. The extent to which the needle is pushed in one direction or the other is proportional to the difference between the average magnitudes of the voltages, which in turn is proportional to the degree of tilt in either direction of the electrolytic transducer 42. Accordingly the meter 28a is graduated in degrees of tilt to either side of a null position as shown in FIG. 2 for convenient reading by the operator. Although the range of the meter and transducer can vary depending upon the particular lift truck and use for which the accessory is intended, for maximum versatility both transducer 42 and meter 28a should preferably be capable of accurately indicating tilt at least to the extent of 12° in either direction from the null position so as to be able to indicate the tilt of the mast in all attitudes for most types of lift trucks, or alternatively indicate side tilt.

The transducer 42 is rigidly mounted within the housing 24a in such a position that it will indicate the attitude of the housing in a predetermined tilting plane corresponding to a vertical plane situated lengthwise of the transducer 42. The preferable means of mounting the transducer 42, as well as the acompanying oscillator, bridge and rectifier circuits, is to place then within the housing in predetermined positions and then secure them by injecting a molded-in-place urethane compound or other suitable potting compound into the housing. In addition to providing the necessary mounting, such potting compound also provides shock resistance and temperature insulation for the components and renders the housing and its contents effectively tamper proof. The potting compound may also provide sufficient holding force on the conduit 26a to obviate the need for a bushing 32 on the housing.

For measuring forward and rearward tilt of the mast 14, the housing 24a is equipped with mounting means for rigidly fastening the housing to the mast in such a position that the predetermined tilting plane of the transducer and thus of the housing is perpendicular to the transverse tilting axis 16 of the mast. In the embodiment of FIGS. 2–4, the housing 24a is adapted for mounting to the side of the mast 14 (which is also perpendicular to the axis 16) and accordingly includes a pair of apertured flanges 72, 74 oriented in a plane parallel with the tilting plane of the transducer 42. Alternatively, if it were desired to mount the housing 24a to the rear rather than to the side of the mast, such apertured flanges would be oriented in a plane perpendicular to the tilting plane of the transducer 42.

In addition to the requirement that the tilting plane of the transducer and housing be oriented properly with respect to the tilting axis of the mast, the housing must also be mounted such that its predetermined null position, corresponding to the null or level position of the transducer 42, coincides with the true vertical position of the mast. Accordingly adjustment means are provided in the form of enlarged apertures 76 in the flanges 72 and 74 respectively through which screws such as 78, having a head portion too large to pass through the apertures and a threaded portion of a cross-section substantially smaller than the area of each aperture may be inserted into threaded sockets tapped into the mast. During installation of the accessory, before the screws 78 are fully tightened, the housing 24a may be rotated slightly while the mast 14 is held in a true vertical position until the meter 28a indicates a zero reading. At this point the null position of the housing corresponds to the vertical position of the mast and the screws may thereafter be tightened. The null position of the housing may alternatively be adjusted with respect to the vertical position of the mast by providing adjustment means for varying the attitude of the transducer 42 with respect to the housing 24a. Moreover, the enlarged apertures 76 need not necessarily be of elongate shape as shown in FIG. 2, but may alternatively be of an enlarged circular or other shape. Although a pair of apertures 76 are depicted in each flange 72 and 74 respectively, a single aperture in each flange would be sufficient for the purpose.

A second housing 24a may be mounted on the lift truck 12 in a location suitable for indicating side tipping of the mast and truck. In such case the housing may be mounted either to the rear of the mast or to the main body 30 of the lift truck in such a position that its tilting plane is perpendicular to the direction of travel of the truck. In such case the foregoing adjustment means is used to insure that the null position of the housing corresponds with the level position of the truck. The meter 28a should be connected to the bridge circuit and installed in the operator's compartment such that the needle moves in the direction of side tilt of the truck.

An important feature of the embodiment of FIGS. 2-4 is the provision of damping means for minimizing unwanted oscillations in the variable tilt indicating signal received by the meter 28a caused by the effect of vibrations from the main body of the lift truck and the mast. Such vibrations may be caused by rough floor surfaces, striking of obstacles and especially abrupt changes in the tilting motion of the mast or forward motion of the truck (i.e., starting and stopping) which tend to ripple the electrolyte 56 generating undesirable oscillating imbalances in the bridge circuit which are not indicative of mast tilt and give false and unstable meter readings. One way in which such unwanted oscillations can be minimized is to make the electrolyte 56 sufficiently viscous as to damp out the undesirable vibrations by making the transducer sensitive only to very slow oscillations having a predetermined period of approximately one-half second or more. Another way is to interpose a sufficient capacitance such as 79 in parallel with the meter 28a so that the meter will be non-responsive to any oscillating signals having a period less than such predetermined period, thereby stabilizing the meter.

Figure 5:
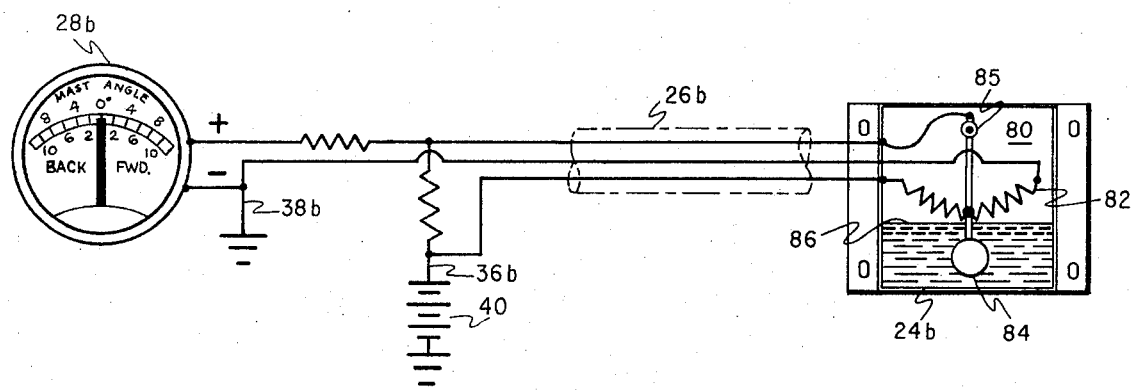
FIG. 5 is a partially schematic diagram of a second embodiment of the accessory featuring a pendulum potentiometer, with portions of the apparatus removed for clarity.

The embodiment of the accessory 10 shown in FIG. 5 features a housing 24b, adapted to be adjustably mounted to the mast 14 or truck in the same manner as the previous embodiment, coupled by a flexible conduit 26b to a d'Arsonval or other DC type electrical meter 28b adapted to be mounted on the main body 30 of the lift truck. Rather than utilizing an electrolytic transducer as the gravity sensing element however, this embodiment employs a pendulum potentiometer designated generally as 80 within the housing 24b for indicating the tilt of the housing to either side of the central null position illustrated in FIG. 5, the tilting plane being perpendicular to the pivoting axis 85 of the pendulum 84. As before, the accessory is coupled to the DC power source 40 of the lift truck by means of leads 36b and 38b respectively. The meter 28b is coupled in parallel with the right-hand portion of the resistor 82, the resistance of which varies depending upon the relative position of the pendulum 84. The variable resistance produces a variable voltage drop proportional to the position of the pendulum and thus to the tilt of the housing 24b which is sensed by the meter 28b and indicated in degrees of tilt. In this embodiment the needle of the meter 28b is spring-biased not to the center of the dial as in the previous embodiment but rather to one side of the dial. Damping of the tilt indicator to isolate it from the aforementioned unwanted truck and mast vibrations is accomplished by immersing the pendulum 84 in a liquid 86 having sufficient viscosity to damp out the effect of such unwanted vibrations.

A third embodiment of the safety accessory is shown in FIGS. 6-8 and employs a housing 24c adjustably mountable to the mast 14 or truck in the same manner as in the previous embodiments. A rolling ball 88 inside a transparent arcuate tube 90 acts as the gravity sensing element of the tilt indicator, the tilting plane constituting a vertical plane passing along the length of the tube 90, and the null position corresponding to that where the ball 88 is in the exact center of the tube as depicted in FIG. 6. The tube 90 is interposed between an electrical light source 98 receiving its power through leads 36c and 38c from the DC power source of the lift truck, and the ends of an array of flexible fiber optic rods 100 which are fastened in side-by-side relation along the bottom of the transparent tube 90 so as to be exposed to the light passing through the tube. The tube and rods respectively are fastened into the housing preferably by means of a suitable potting compound (not shown). The rods 100, forming a coherent bundle, pass through the conduit 26c and emerge in the display device 28c where their ends are fastened, again preferably by potting, in precisely the same order from top to bottom that such rods are arranged from right to left adjacent the bottom of the tube 90.

In operation the tilt of the housing 24c, corresponding to the tilt of the lift truck mast or side tilt of the truck, depending on where mounted, causes the ball 88 to deviate from its central null position in either direction along the arcuate bottom of the transparent tube 90 by a distance proportional to the degree of tilt. The light from the bulb 98 passes through the transparent tube 90 and is sensed by the ends of the fiber optic rods 100. However a portion of such light is blocked by the ball 88, producing a light pattern sensed by the rods 100 which varies depending upon the position of the ball 88. The light pattern thus produced is transmitted by the rods and emerges in the tilt display device 28c in the operator's compartment of the lift truck. Accordingly, with the housing 24c in its null position corresponding to a vertical mast, the ball 88 will show up as a dark image 102 (FIG. 7) appearing in the center of the vertical display. Should the ball 88 move to the right of the tube 90 due to the forward tilt of the mast, the image 102 will move upward proportionately. Conversely, if the ball 88 moves to the left due to the rearward tilting of the mast, the image 102 will move downward proportionately. (To indicate side tilt of the truck, the display should preferably be horizontal rather than vertical so that the image moves in the direction of side tilt.) A viscous transparent liquid 104 is provided within the tube 88 for eliminating the effect of the aforementioned unwanted truck and mast vibrations in the same manner as described with respect to the previous embodiments.

An alternative type of tilt indicator utilizing the optical principles just described might comprise an inverted arcuate tube having a viscous liquid defining a bubble, which bubble would generate a variable-position image similar to that generated by the ball 88. Another alternative might feature a pendulum swinging in the space between an array of fiber optic rod ends and a light source, such pendulum serving to generate the variable image.

The terms and expressions which have been employed in the foregoing abstract and specification are used therein as terms of description and not of limitation, and there is no intention, in the use of such terms and expressions of excluding equivalents of the features shown and described or portions thereof, it being recognized that the scope of the invention is defined and limited only by the claims which follow.

What is claimed is:

1. In a lift truck of the type having a load lifting mast tiltable about a tilting axis both forwardly and rearwardly from a vertical position, power means for movable tilting said mast, and a load carriage mounted for vertical reciprocation on said mast, a safety accessory comprising: a housing; gravity sensing tilt indicator means mounted within said housing for sensing the degree of tilt of said housing in a predetermined tilting plane, said tilt indicator means including electrically powered means for generating a variable signal corresponding to said degree of tilt of said housing, and also corresponding to the direction of tilt of said housing in either direction from a predetermined null position of said housing; mounting means adapted for rigidly mounting said housing to said lift truck mast in such a position that said predetermined tilting plane of said housing is perpendicular to said tilting axis of said mast; adjustment means associated with said housing for permitting said null position of said housing to be adjusted with respect to said mast to achieve correspondence between said predetermined null position of said housing and said vertical position of said mast; tilt display means adapted for mounting on the main body of said lift truck for receiving said signals generated by said tilt indicator means and providing visual indicia of both direction and degree of tilt of said housing in either direction from said predetermined null position in response to said signals; a flexible conduit coupled with said tilt indicator means and adapted to extend therefrom to said tilt display means, said conduit including signal transmission means for transmitting said signals generated by said tilt indicator means to said tilt display means and further including means for conducting electrical current from said lift truck to said tilt indicator means to generate said signals, said conduit having sufficient excess length to permit it to compensate for the tilting movement of said mast relative to said main body of said lift truck regardless of the tilting position of said mast; said gravity sensing tilt indicator means comprising an electrolytic transducer and an associated bridge circuit and said tilt display means comprising a direct current meter capable of sensing polarity and normally biased to a center position shunted across said bridge circuit, said accessory further comprising means for tapping the direct current electrical power source of said lift truck and converting said electrical power to alternating current having a positive and negative half-cycle for powering said electrolytic transducer and bridge circuit; and a rectification circuit interposed between said transducer and said meter for providing a direct current signal to said meter.

2. The accessory of claim 1 wherein said mounting means includes a pair of flanges on said housing, each having an aperture formed therein, and further includes threaded fastening means insertable through said apertures having a head portion too large to pass through said apertures and a threaded portion of a cross-section substantially smaller than the area of said apertures, so as to permit the position of said housing to be adjusted relative to said mast while said threaded fasteners are inserted but not fully tightened.

3. The accessory of claim 1 wherein said mounting means includes a pair of apertured flanges of said housing situated in a plane parallel to said tilting plane of said housing for permitting said housing to be mounted to the side of said mast.

4. The accessory of claim 1 including damping means for minimizing the effects on said variable tilt indicating signal of vibrations of said lift truck or mast which are not indicative of the degree of tilt of said mast so as to render said visual indicia non-responsive to said vibrations.

5. The accessory of claim 4 wherein said damping means comprises a liquid in contact with said gravity sensing tilt indicator means having sufficient viscosity to minimize said effects of said vibrations.

6. The accessory of claim 4 wherein said damping means comprises means for rendering said visual indicia substantially non-responsive to vibrations having a period of less than one-half second.

7. The accessory of claim 1 wherein said tilt indicator means and said tilt display means include means for indicating the tilt of said housing within a range of at least 5° to one side of said null position and 10° to the opposite side of said null position.

8. The accessory of claim 7 wherein said tilt indicator means and said tilt display means include means for indicating the tilt of said housing within a range of at least 12° in either direction from said null position.

9. The accessory of claim 1 including a pair of fastening means for preventing said conduit means from being forcibly detached either from said tilt indicator means or from said tilt display means.

10. In a lift truck of the type having a load lifting mast tiltable about a tilting axis both forwardly and rearwardly from a vertical position, power means for movably tilting said mast, and a load carriage mounted for vertical reciprocation on said mast, a safety accessory comprising: a housing; gravity sensing tilt indicator means mounted within said housing for sensing the degree of tilt of said housing in a predetermined tilting plane, said tilt indicator means including electrically powered means for generating a variable signal corresponding to said degree of tilt of said housing, and also corresponding to the direction of tilt of said housing in either direction from a predetermined null position of said housing; mounting means adapted for rigidly mounting said housing to said lift truck mast in such a position that said predetermined tilting plane of said housing is perpendicular to said tilting axis of said mast; adjustment means associated with said housing for permitting said null position of said housing to be adjusted with respect to said mast to achieve correspondence between said predetermined null position of said housing and said vertical position of said mast; tilt display means adapted for mounting on the main body of said lift truck for receiving said signals generated by said tilt indicator means and providing visual indicia of both direction and degree of tilt of said housing in either direction from said predetermined null position in response to said signals; a flexible conduit coupled with said tilt indicator means and adapted to extend therefrom to said tilt display means, said conduit including signal transmission means for transmitting said signals generated by said tilt indicator means to said tilt display means and further including means for conducting electrical current from said lift truck to said tilt indicator means to generate said signals, said conduit having sufficient excess length to permit it to compensate for the tilting movement of said mast relative to said main body of said lift truck regardless of the tilting position of said mast; said tilt indicator means including a light source and a movable gravity sensing element juxtaposed with an array of fiber optic rod ends arranged such that the rod ends are exposed to a variable light pattern corresponding to the tilt of said housing as indicated by the variable position of said gravity sensing element, said signal transmission means comprising said rods arranged in a coherent bundle and said tilt display means comprising the opposite ends of said rods arranged coherently with respect to their arrangement adjacent said gravity sensing element.

11. The accessory of claim 10 wherein said mounting means includes a pair of flanges on said housing, each having an aperture formed therein, and further includes threaded fastening means insertable through said apertures having a head portion too large to pass through said apertures and a threaded portion of a cross-section substantially smaller than the area of said apertures, so as to permit the position of said housing to be adjusted relative to said mast while said threaded fasteners are inserted but not fully tightened.

12. The accessory of claim 10 wherein said mounting means includes a pair of apertured flanges on said housing situated in a plane parallel to said tilting plane of said housing for permitting said housing to be mounted to the side of said mast.

13. The accessory of claim 10 including damping means for minimizing the effects on said variable tilt indicating signal of vibrations of said lift truck or mast which are not indicative of the degree of tilt of said mast so as to render said visual indicia non-responsive to said vibrations.

14. The accessory of claim 13 wherein said damping means comprises a liquid in contact with said gravity sensing tilt indicator means having sufficient viscosity to minimize said effects of said vibrations.

15. The accessory of claim 13 wherein said damping means comprises means for rendering said visual indicia substantially non-responsive to vibrations having a period of less than one-half second.

16. The accessory of claim 10 wherein said tilt indicator means and said tilt display means include means for indicating the tilt of said housing within a range of at least 5° to one side of said null position and 10° to the opposite side of said null position.

17. The accessory of claim 16 wherein said tilt indicator means and said tilt display means includes means for indicating the tilt of said housing within a range of at least 12° in either direction from said null position.

18. The accessory of claim 10 including a pair of fastening means for preventing said conduit means from being forcibly detached either from said tilt indicator means or from said tilt display means.

* * * * *

UNITED STATES PATENT OFFICE
CERTIFICATE OF CORRECTION

PATENT NO. : 3,865,265
DATED : February 11, 1975
INVENTOR(S) : Ronald A. Brudi, Randall W. Mathewson and Randall P. Wheeler It is certified that error appears in the above-identified patent and that said Letters Patent are hereby corrected as shown below:

| | |
|---|---|
| Col. 2, Line 31 | After "inexpensive" insert --enough--. |
| Col. 6, Line 33 | Change "then" to --them--. |
| Col. 8 Line 57 | After "28c" insert --mounted--. |
| Col. 9, Lines 28,29 | Change "movable" to --movably--; |
| Line 43 | Change "assocaited" to --associated--. |

Signed and sealed this 24th day of June 1975.

(SEAL)
Attest:

RUTH C. MASON
Attesting Officer

C. MARSHALL DANN
Commissioner of Patents
and Trademarks